(12) United States Patent
Whitehead et al.

(10) Patent No.: US 6,865,011 B2
(45) Date of Patent: Mar. 8, 2005

(54) SELF-STABILIZED ELECTROPHORETICALLY FRUSTRATED TOTAL INTERNAL REFLECTION DISPLAY

(75) Inventors: Lorne A. Whitehead, Vancouver (CA); Michele Ann Mossman, Vancouver (CA)

(73) Assignee: The University of British Columbia, Vancouver (CA)

( * ) Notice: Subject to any disclaimer, the term of this patent is extended or adjusted under 35 U.S.C. 154(b) by 55 days.

(21) Appl. No.: 10/625,805

(22) Filed: Jul. 24, 2003

(65) Prior Publication Data

US 2004/0136047 A1 Jul. 15, 2004

Related U.S. Application Data

(60) Provisional application No. 60/399,168, filed on Jul. 30, 2002.

(51) Int. Cl.[7] .......................... G02B 26/00; G02B 26/08
(52) U.S. Cl. ...................... 359/296; 359/263; 359/222
(58) Field of Search ................................ 359/296, 291, 359/222, 263, 620, 253, 252; 345/84; 348/759; 349/62

(56) References Cited

U.S. PATENT DOCUMENTS

| 3,291,554 | A | 12/1966 | Price |
| 3,556,638 | A | 1/1971 | Banks et al. |
| 3,571,511 | A | 3/1971 | Myer |

(List continued on next page.)

FOREIGN PATENT DOCUMENTS

| DE | 3720861 | A | 3/1989 |
| DE | 4343808 | A1 | 6/1995 |
| EP | 0023741 | A1 | 2/1981 |
| EP | 204427 | A | 12/1986 |
| EP | 728799 | A1 | 8/1996 |
| EP | 797127 | A | 9/1997 |
| EP | 0807832 | A2 | 11/1997 |
| GB | 2265024 | A | 9/1993 |
| JP | 54057576 | | 5/1979 |
| JP | 55-525 | | 1/1980 |
| JP | 59078816 | | 5/1984 |
| JP | 60038130 | | 2/1985 |
| JP | 60-185918 | | 9/1985 |
| JP | 2-254405 | | 10/1990 |
| JP | 5-281481 | | 10/1993 |
| WO | WO 95/31738 | | 11/1995 |
| WO | WO 97/31276 | | 8/1997 |
| WO | WO 99/12069 | | 3/1999 |
| WO | WO 99/15595 | | 4/1999 |
| WO | WO 99/28890 | | 6/1999 |
| WO | WO 00/17477 | | 3/2000 |
| WO | WO 01/37627 | | 5/2001 |

OTHER PUBLICATIONS

Dalisa, A., "Electrophoretic Display Technology," IEEE Transactions on Electron Devices, vol. 24, 827–834, 1977.

(List continued on next page.)

*Primary Examiner*—Scott J. Sugarman
*Assistant Examiner*—Richard Hanig
(74) *Attorney, Agent, or Firm*—Oyen Wiggs Green & Mutala

(57) ABSTRACT

An image display has a transparent front sheet with a prismatically microstructured inward surface and a rear sheet substantially parallel to and spaced from the front sheet. An electrophoretic suspension fills the space between the sheets. The suspension is formed by suspending non-light-scattering light absorptive particles in an electrophoresis medium until the particles form a substantially unitary thermodynamically stable agglomeration. Application of a voltage across the suspension establishes an electric field for controllably electrophoretically moving the particle agglomeration as a substantially unitary whole toward the front sheet's inward surface to frustrate total internal reflection at the inward surface of light rays passing through the front sheet.

24 Claims, 2 Drawing Sheets

U.S. PATENT DOCUMENTS

| | | |
|---|---|---|
| 3,612,653 A | 10/1971 | Rajchman |
| 3,698,793 A | 10/1972 | Tellerman |
| 3,730,608 A | 5/1973 | Castegnier |
| 3,746,785 A | 7/1973 | Goodrich |
| 3,796,480 A | 3/1974 | Preston, Jr. et al. |
| 3,987,668 A | 10/1976 | Popenoe |
| 4,113,360 A | 9/1978 | Baur et al. |
| 4,135,960 A | 1/1979 | Shuppert et al. |
| 4,148,563 A | 4/1979 | Herbert |
| 4,156,745 A | 5/1979 | Hatzakis et al. |
| 4,165,155 A | 8/1979 | Gordon, II et al. |
| 4,218,302 A | 8/1980 | Dalisa et al. |
| 4,249,814 A | 2/1981 | Hull et al. |
| 4,324,456 A | 4/1982 | Dalisa |
| 4,391,490 A | 7/1983 | Hartke |
| 4,420,897 A | 12/1983 | Castleberry |
| 4,448,622 A | 5/1984 | Duchane et al. |
| 4,536,061 A | 8/1985 | Nishimura |
| 4,617,608 A | 10/1986 | Blonder et al. |
| 4,714,326 A | 12/1987 | Usui et al. |
| 4,723,834 A | 2/1988 | Van de Venne et al. |
| 4,867,515 A | 9/1989 | Normandin |
| 4,895,428 A | 1/1990 | Nelson et al. |
| 5,045,847 A | 9/1991 | Tarui et al. |
| 5,099,343 A | 3/1992 | Margerum et al. |
| 5,128,782 A | 7/1992 | Wood |
| 5,147,519 A | 9/1992 | Legge |
| 5,221,987 A | 6/1993 | Laughlin |
| 5,235,463 A | 8/1993 | Broussoux et al. |
| 5,283,148 A | 2/1994 | Rao |
| 5,301,009 A | 4/1994 | Shurtz, II |
| 5,317,667 A | 5/1994 | Weber et al. |
| 5,319,491 A | 6/1994 | Selbrede |
| 5,396,350 A | 3/1995 | Beeson et al. |
| 5,397,669 A | 3/1995 | Rao |
| 5,425,710 A | 6/1995 | Khair et al. |
| 5,455,709 A | 10/1995 | Dula, III et al. |
| 5,504,618 A | 4/1996 | Hirs et al. |
| 5,530,053 A | 6/1996 | Rao et al. |
| 5,530,067 A | 6/1996 | Rao et al. |
| 5,555,327 A | 9/1996 | Laughlin |
| 5,555,558 A | 9/1996 | Laughlin |
| 5,561,541 A | 10/1996 | Sharp et al. |
| 5,566,260 A | 10/1996 | Laughlin |
| 5,598,280 A | 1/1997 | Nishio et al. |
| 5,608,837 A | 3/1997 | Tai et al. |
| 5,731,900 A | 3/1998 | Milner |
| 5,745,632 A | 4/1998 | Dreyer |
| 5,841,916 A | 11/1998 | Laughlin |
| 5,880,886 A | 3/1999 | Milner |
| 5,959,777 A | 9/1999 | Whitehead |
| 5,999,307 A | 12/1999 | Whitehead |
| 6,064,784 A | 5/2000 | Whitehead et al. |
| 6,088,013 A | 7/2000 | Montour et al. |
| 6,215,920 B1 | 4/2001 | Whitehead et al. |
| 6,304,365 B1 | 10/2001 | Whitehead |
| 6,384,979 B1 | 5/2002 | Whitehead et al. |
| 6,437,921 B1 | 8/2002 | Whitehead |
| 6,452,734 B1 | 9/2002 | Whitehead et al. |
| 6,562,889 B2 | 5/2003 | Rao |

OTHER PUBLICATIONS

Mürau et al., "The understanding and elimination of some suspension instabilities in an electrophoretic display," J. Appl. Phys., vol. 49, No. 9, Sep. 1978, pp. 4820–4829.

Harbour et al., "Subdivided Electrophoretic Display", Xerox Disclosure Journal, vol. 4, No. 6, Nov. 1979, p. 705.

L.A. Whitehead, "Simplified Ray Tracing in Cylindrical Systems", Applied Optics, vol. 21, No. 19, pp. 3536–3538, Oct. 1, 1982.

Carlson et al, "Surface Property Changes Induced In Poly(1–Hexene) Elastomer By High Energy Ion Irradition", Proc. 4th Intl. Conf. on Ion Bean Modification of Materials, Ithaca, NY, Jul. 16–20, 1984, pp. 507–512.

Remillard et al, "Evanescent–wave scattering by electrophoretic microparticles: a mechanism for optical switching", Applied Optics, vol. 34, No. 19, Jul. 1, 1995, pp. 3777–3785.

George Kotelly, "Patented fiber switch revs speed, cuts cost", in "Lightwave" Oct., 1995, web site publication of PennWell Publishing Co., Tulsa, OK.

M. Mohammadi, "Colloidal Refractometry: Meaning and Measurement of Refractive Index for Dispersions: The Science That Time Forgot", Advances in Colloid and Interface Science 62 (1995) 17–29.

Qin et al, "Elastomeric Light Valves", Advanced Materials 1997, 9, No. 5, pp. 407–410.

3M Fluorinert™ Electronic Liquid brochure, http://www.3m.com/fluids/florinrt.html, Sep., 1998.

Neufeldt, Victoria. Webster's New World Dictionary of American English, 3rd College Edition. Webster's New World, New York, New York, p. 857. Dec. 31, 1998.

Drzaic, P., et al, "A Printed and Rollable Bistable Electronic Display," Society for Information Display Symposium Proceedings, 1131–1134, 1998.

Nakamura, E. et al, "Development of Electrophoretic Display Using Microencapsulated Suspension," Society for Information Display Symposium Proceedings, 1014–1017, 1998.

Mossman, M.A. et al, "New Reflective Display Technique Based on Total Internal Reflection in Prismatic Microstructures," Society for Information Display International Research Display Conference Proceedings, 311–314, 2000.

"Krytox® 157 FS Fluorinated Oil," 2000 brochure of E.I. du Pont de Nemours and Company.

Kambe et al, in "Refractive Index Engineering of Nano–Polymer Composites," Materials Research Society Conference, San Francisco, Apr. 16–20, 2001.

Mossman, M.A. et al, "New Reflective Display Technique Based on Total Internal Reflection and Subtractive Colour Filtering," Society for Information Display Symposium Proceedings, 1054–1057, 2001.

Mossman, M.A. et al, "New Method for Obtaining Long–Term Image Quality in a TIR–Based Electrophoretic Display," Society for Information Display, International Research Display Conference Proceedings, 851–854, Oct. 1–4, 2002.

SELF-STABILIZED ELECTROPHORETICALLY FRUSTRATED TOTAL INTERNAL REFLECTION DISPLAY

REFERENCE TO RELATED APPLICATION

This application claims the benefit of U.S. Provisional Patent Application Ser. No. 60/399,168 filed 30 Jul. 2002.

TECHNICAL FIELD

This invention improves the long-term stability of image displays which electrophoretically frustrate total internal reflection (TIR).

BACKGROUND

It is known that images can be displayed by controllably frustrating TIR to switch selected pixels of a multi-pixel display between a reflective state in which light incident on those pixels undergoes TIR, and a non-reflective state in which TIR is frustrated at those pixels. It is also known that electrophoresis can be used to controllably frustrate TIR and controllably switch the state of pixels in such displays. Electrophoresis is a well-known phenomenon whereby an electrostatically-charged species moves through a medium due to the influence of an applied electric field. For example, an electromagnetic field can be controllably applied to move particles through an electrophoretic medium toward or away from an evanescent wave region to frustrate TIR at selected pixel portions of the region.

It is also known that repeated switching of a display which utilizes electrophoretically-mobile particles can result in a non-uniform distribution or clustering of the particles, gradually deteriorating the quality of images produced by the display over time. See for example Dalisa, A., "Electrophoretic Display Technology," IEEE Transactions on Electron Devices, Vol. 24, 827–834, 1977; and Mürau et al, "The understanding and elimination of some suspension instabilities in an electrophoretic display," J. Appl. Phys., Vol. 49, No. 9, September 1978, pp. 4820–4829. It has been shown that such undesirable clustering can be reduced by encapsulating groups of suspended particles in separate microfluidic regions. See for example Nakamura et al, "Development of Electrophoretic Display Using Microencapsulated Suspension," Society for Information Display Symposium Proceedings, 1014–1017, 1998 and Drzaic et al, "A Printed and Rollable Bistable Electronic Display," Society for Information Display Symposium Proceedings, 1131–1134, 1998.

SUMMARY OF INVENTION

This invention improves the long-term image stability of an electrophoretically-mobile particle display, by providing a thermodynamically stable agglomeration of particles in the electrophoretic suspension. The agglomeration can be electrophoretically moved as a substantially unitary whole to switch the display's pixels between reflective and non-reflective states, without encapsulating groups of suspended particles in separate regions.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
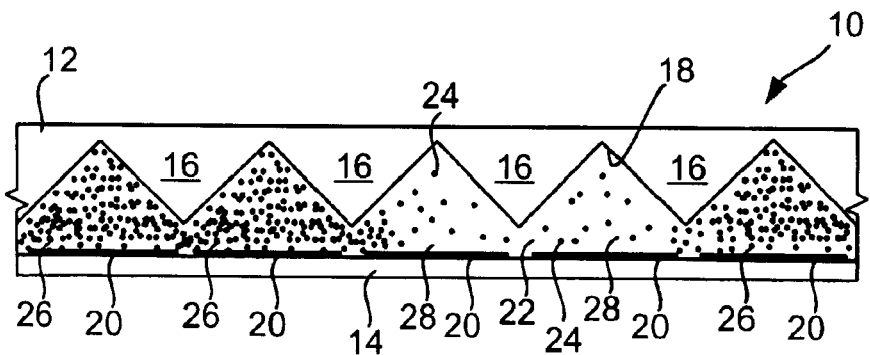
FIG. 1 is a fragmented, cross-sectional view, on a greatly enlarged scale, of a portion of a prior art electrophoretically frustrated TIR image display, depicting undesirable non-uniform particle distribution.

FIG. 1 depicts a portion of an electrophoretically-frustrated TIR image display 10 having a transparent front sheet 12 and a rear sheet 14 substantially parallel to and spaced from front sheet 12. Front sheet 12's inward surface is microstructured by forming a large plurality of parallel, reflective micro-prisms 16 thereon. Alternatively, front sheet 12's inward surface can be microstructured by forming a large plurality of approximately hemispherical high refractive index transparent hemi-beads thereon, as described in U.S. patent application Ser. No. 10/086,349 filed 4 Mar. 2002, which is incorporated herein by reference. A thin, continuous, transparent electrode 18 is applied to the inward surfaces of prisms 16. A segmented electrode 20 is applied to the inward surface of rear sheet 14, to apply separate voltages (corresponding to individual pixels) between each adjacent pair of prisms 16. There need not be a 1:1 correspondence between each pixel and one of prisms 16 or one of the segments of electrode 20; each pixel preferably corresponds to a plurality of prisms 16 and to a (possibly different) plurality of segments of electrode 20. An electrophoresis medium 22, for example, a low refractive index, low viscosity, electrically insulating liquid such as Fluorinert™ perfluorinated hydrocarbon liquid available from 3M, St. Paul, Minn. substantially fills the space between sheets 12, 14 forming a TIR interface between sheet 12 and medium 22. A finely dispersed suspension of non-light-scattering, light-absorptive particles 24, such as pigment particles, is provided in medium 22.

A voltage source (not shown) is electrically connected between electrodes 18, 20 to controllably apply a voltage across selected pixel regions of medium 22. Application of a voltage across a selected pixel region electrophoretically moves particles 24 suspended within the selected region to form a layer that begins within about 0.25 micron of the evanescent wave zone adjacent the inward surfaces of the selected region's prisms 16 and extends about 5 microns into the region. When electrophoretically moved as aforesaid, particles 24, which have a higher refractive index than the surrounding fluid and are much smaller than a wavelength of light and therefore substantially non-light-scattering, cause the layer to have an effective refractive index that is substantially higher than that of the surrounding liquid. This absorptive particle layer has both a real component of the refractive index that frustrates TIR and causes transmission, rather than reflection, of the light ray at the interface; and an imaginary component that causes absorption of the light ray at it passes through the absorptive particle layer. There is essentially no scattering of the light as it interacts with the particles, but rather the light is absorbed. This gives the selected pixel region a dark appearance to an observer who looks at sheet 12's outward surface. Application of an opposite polarity voltage across the selected pixel region electrophoretically moves particles 24 toward that region's electrode 20, such that incident light rays which pass through sheet 12 are reflected by TIR at that region's TIR interface, giving the region a "white" appearance to an observer who looks at sheet 12's outward surface.

Further details of the construction and optical characteristics of electrophoretically-frustrated TIR image displays can be found in U.S. Pat. Nos. 6,064,784; 6,215,920; 6,304,365; 6,384,979; 6,437,921; and 6,452,734 all of which are incorporated herein by reference; and, in the aforementioned U.S. patent application Ser. No. 10/086,349.

Electrophoretically-frustrated display 10 can exhibit undesirable clustering of particles 24 over time. More particularly, particles 24 tend to form loose agglomerates 26, surrounded by regions 28 of medium 22 containing relatively few suspended particles 24. Such clustering often results in long-term deterioration of the display's image quality and overall performance.

Figure 2A:
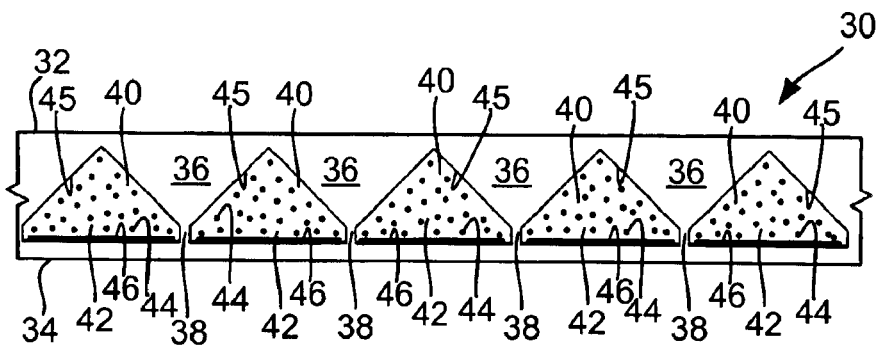
FIG. 2A is a fragmented, cross-sectional view, on a greatly enlarged scale, of a portion of a prior art electrophoretically frustrated TIR image display, before application of an electric field.
Figure 2B:
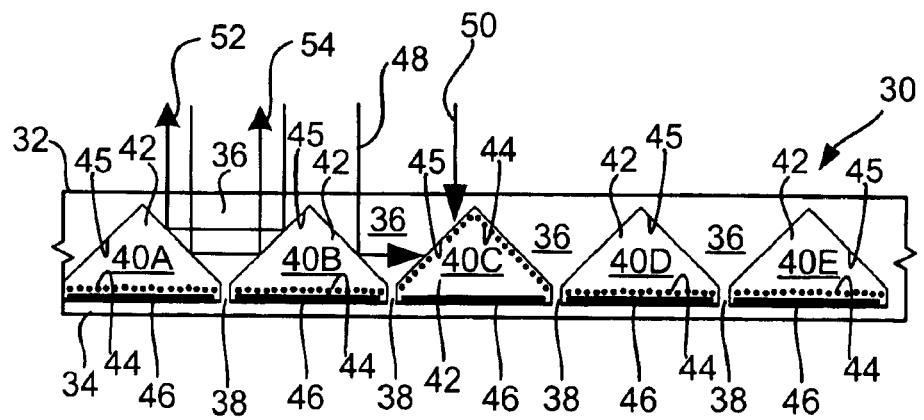
FIG. 2B depicts the FIG. 2A display after selective application of an electric field.

FIGS. 2A and 2B depict a prior art technique for reducing undesirable particle clustering in an electrophoretically-frustrated display 30 having a transparent front sheet 32 and a rear sheet 34. Front sheet 32's inward surface is microstructured by forming a large plurality of parallel, reflective micro-prisms 36 thereon. The apices 38 of micro-prisms 36 are connected to rear sheet 34's inward surface, forming an encapsulated channel 40 between the opposed facets of each adjacent pair of prisms 36. Each channel 40 is filled with an electrophoresis medium 42, forming a TIR interface between sheet 32 and medium 42. Within each channel 40, medium 42 contains a finely dispersed suspension of non-light-scattering light-absorptive particles 44, such as pigment particles. Within each channel 40, a thin transparent electrode 45 is applied to the inward surfaces of the adjacent prisms 36 which define that channel. A segmented electrode 46 is applied to the inward surface of rear sheet 34, to create separate pixel regions corresponding to each channel 40 (or corresponding to a selected group of adjacent channels 40).

A voltage source (not shown) is electrically connected between each channel's electrode pair 45, 46 to controllably apply a voltage across the corresponding pixel region. Application of a voltage across a selected pixel region electrophoretically moves particles 44 suspended within the selected region to form a layer that begins within about 0.25 micron of the evanescent wave zone adjacent the inward surfaces of the selected region's prisms 16 and extends about 5 microns into the region, as depicted in the case of channel 40C (FIG. 2B). When electrophoretically moved as aforesaid, particles 44, which have a higher refractive index than the surrounding fluid and are much smaller than a wavelength of light and therefore substantially non-light-scattering, cause the layer to have an effective refractive index that is substantially higher than that of the surrounding liquid. This absorptive particle layer has both a real component of the refractive index that frustrates TIR and causes transmission, rather than reflection, of the light ray at the interface; and an imaginary component that causes absorption of the light ray at it passes through the absorptive particle layer. There is essentially no scattering of the light as it interacts with the particles, but rather the light is absorbed. This gives the selected pixel region a dark appearance to an observer who looks at sheet 32's outward surface. Application of an opposite polarity voltage across a selected pixel region electrophoretically moves (i.e. switches) particles 44 toward that region's electrode 46, as depicted in the case of channels 40A and 40B, such that light rays 52, 54 which pass through sheet 32 are reflected by TIR at that region's TIR interface, giving the region a "white" appearance to an observer who looks at sheet 32's outward surface.

Although encapsulation of groups of particles 44 within separate channels 40 reduces undesirable clustering, it may in some cases be impractical to fabricate, fill or maintain channels 40.

In accordance with the invention, the electrophoresis medium contains a high concentration of light-absorptive pigment particles, forming a sponge-like electrophoretic suspension paste having a volume fraction of particles in the suspension that is sufficiently large that the particles do not move freely within the electrophoresis medium, thus preventing the lateral particle motion which is believed to cause long-term particle clustering. More specifically, the volume fraction is sufficiently large that the suspension is in a thermodynamically stable state such that a uniform distribution of particles is maintained. The volume fraction at which this thermodynamic stability occurs depends on the inter-particle force relationship for the specific particles within the particular suspension. The suspension can be formed by adding particles to the electrophoresis medium until the particles form a substantially unitary agglomeration which can be electrophoretically moved and compressed as a substantially unitary whole in response to an applied voltage, to controllably frustrate TIR. Alternatively, a dilute suspension can be initially formed, followed by evaporation of the electrophoresis medium until the desired volume fraction of particles in the suspension is attained. A dispersant such as Krytox™ 157-FSL, Krytox™ 157-FSM or Krytox™ 157-FSH fluorinated oil (respectively having specified molecular weights of approximately 2500, 3500–4000 and 7000–7500, CAS Registry No. 860164-51-4, DuPont Performance Lubricants, Wilmington, Del. 19880-0023) is preferably added to the suspension to facilitate stable suspension of the particles in the electrophoresis medium.

Figure 3A:
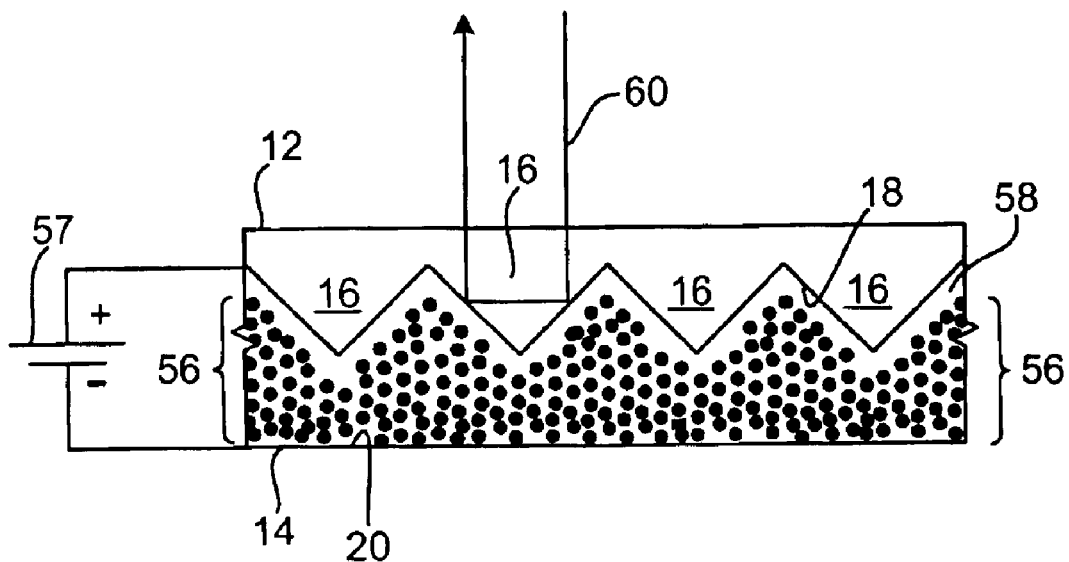
FIG. 3A is a fragmented, cross-sectional view, on a greatly enlarged scale, of a portion of one pixel of an electrophoretically frustrated TIR image display in accordance with the invention, before application of an electric field.
Figure 3B:
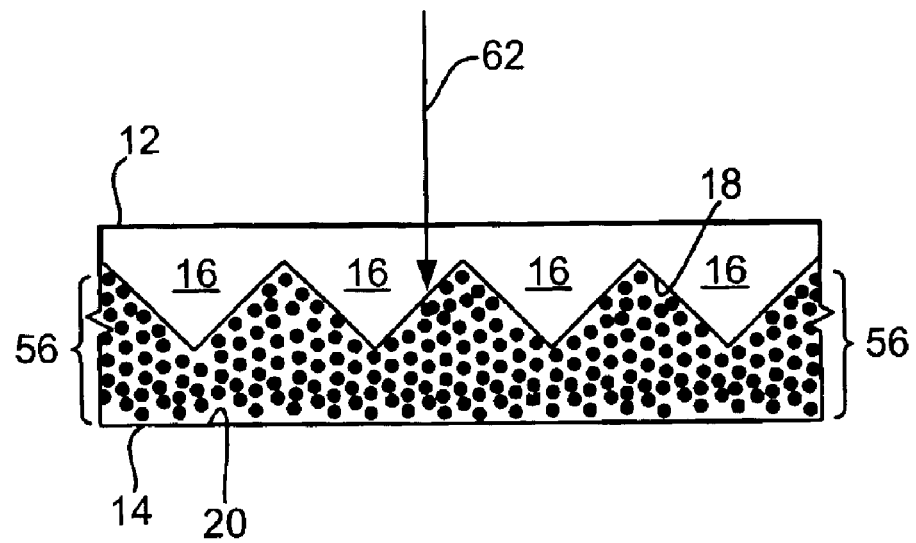
FIG. 3B depicts the FIG. 3A display after selective application of an electric field.

This is shown schematically in FIGS. 3A and 3B, which depict a selected pixel region of the FIG. 1 display structure with an electrophoretic suspension having an electrophoretically compressible, non-light-scattering light absorbing particle agglomeration 56 substituted for electrophoresis medium 22 and particles 24. A voltage source 57 is electrically connected between electrodes 18, 20 to controllably apply a voltage across electrophoresis medium 22. The applied voltage affects substantially all particles 24 between electrodes 18, 20 (i.e. particle agglomeration 56). As shown in FIG. 3A, the applied voltage electrophoretically compresses particle agglomeration 56 away from electrode 18 toward electrode 20. This leaves a thin region 58 of low refractive index electrophoretic fluid between the inward surface of sheet 12 and particle agglomeration 56, which is sufficiently thick that it enables substantially all of the evanescent wave to be confined to a particle-free region of fluid and thus causes TIR, such that light ray 60 which passes through sheet 12 is reflected by TIR at the depicted region's TIR interface, giving the region a "white" appearance to an observer who looks at sheet 12's outward surface.

More particularly, particles 24 are substantially incompressible, but particle agglomeration 56 has many tiny inter-particle voids containing electrophoresis medium 22. Since particles 24 are electrostatically charged as a result of chemical interactions between the solvent and dispersant molecules and surface groups on the particles, application of a voltage across particle agglomeration 56 moves particles 24 as a substantially unitary whole toward one or the other of electrodes 18, 20 depending on the polarity of the applied voltage. This compresses particle agglomeration 56, packing particles 24 even more tightly together and forcing electrophoresis medium 22 out of the interparticle voids.

As shown in FIG. 3B, application of an opposite polarity voltage across the depicted pixel region electrophoretically compresses (i.e. switches) particle agglomeration 56 away from electrode 20 toward electrode 18, to within about 0.25 micron of the evanescent wave zone adjacent the inward surfaces of the depicted region's prisms 16. When electrophoretically compressed toward electrode 18 as aforesaid, particle agglomeration 56 scatters or absorbs incident light ray 62 by causing a refractive index mismatch which frustrates TIR, giving the depicted pixel region a dark appearance to an observer who looks at sheet 12's outward surface.

It is counterintuitive that the large volume fraction of particles 24 in the suspension allows sufficient motion of particles 24 within the evanescent wave region to controllably modulate TIR. Although the large volume fraction of particles 24 in the suspension gives the suspension high bulk viscosity, the low refractive index electrophoresis medium 22 filling the inter-particle voids has very low viscosity, and thus it is comparatively easy to compress particle agglomeration 56 to force a region of particle-free low refractive index electrophoresis medium 22 into contact with the inward surface of sheet 12. More specifically, since the viscosity of electrophoresis medium 22 is low and since the particle-free region need only be thick enough to confine substantially all of the evanescent wave, good optical control can be maintained.

Electrode 20 can be segmented to provide a plurality of electrode segments, as shown in FIG. 1. A suitable controller (not shown) can then be used to apply a first voltage between the first electrode and a first one of the electrode segments, apply a second voltage between the first electrode and a second one of the electrode segments, etc. in order to establish distinct electric fields between selected electrodes. Each electrode segment (or group of adjacent electrode segments) corresponds to an individually controllable pixel.

As will be apparent to those skilled in the art in light of the foregoing disclosure, many alterations and modifications are possible in the practice of this invention without departing from the spirit or scope thereof. For example, as previously explained, the volume fraction of particles 24 in the suspension should be sufficiently large that the suspension is in a thermodynamically-stable state such that a uniform distribution of particles is maintained. The volume fraction at which this thermodynamic stability occurs depends on the inter-particle force relationship for the specific particles within the particular suspension. For many suspensions this thermodynamic stability occurs within the range of about 25% to 75%, with efficacy improving as the volume fraction of particles 24 is increased within the foregoing range. Electrophoresis medium 22 and the dispersant constitute the remaining volume fraction of particle agglomeration 56 which is not occupied by particles 24. Higher volume fractions of particles 24 in the suspension (within the aforementioned range) reduce the likelihood of particles 24 clustering together after repeated switching. But, if the volume fraction of particles 24 in the suspension is greater than about 75%, insufficient electrophoresis medium 22 remains in the inter-particle voids, making it difficult to attain the highly reflective state by compressing particle agglomeration 56 and forcing a sufficient quantity of electrophoresis medium 22 out of the inter-particle voids to form low refractive index electrophoretic fluid region 58. The desired compressibility of particle agglomeration 56 is also impaired if insufficient dispersant is provided in the suspension, resulting in non-stable suspension of particles 24 which can cause particles 24 to adhere to one another. The scope of the invention is to be construed in accordance with the substance defined by the following claims.

What is claimed is:

1. An image display, comprising:
   (a) a transparent front sheet;
   (b) a rear sheet substantially parallel to and spaced from the front sheet;
   (c) an electrophoretic suspension substantially filling the space between the sheets, the suspension further comprising:
      (i) an electrophoresis medium;
      (ii) non-light-scattering light absorptive particles suspended in the medium;
      the particles occupying a sufficiently large volume fraction of the suspension to form a thermodynamically stable agglomeration such that the particles do not move freely within the electrophoresis medium; and,
   (d) means for applying a voltage across the suspension for controllably electrophoretically moving the agglomeration as a substantially unitary whole toward an inward surface of the front sheet to frustrate total internal reflection at the inward surface of light rays passing through the front sheet.

2. An image display as defined in claim 1, wherein the particles occupy more than about a 25% volume fraction of the suspension.

3. An image display as defined in claim 1, wherein the particles occupy between about a 25% and a 75% volume fraction of the suspension.

4. An image display as defined in claim 1, the suspension further comprising a dispersant.

5. An image display as defined in claim 4, the dispersant further comprising a fluorinated oil.

6. An image display as defined in claim 4, the agglomeration compressible as a substantially unitary whole toward:
   (a) the front sheet in response to a first applied voltage; and,
   (b) the rear sheet in response to a second applied voltage.

7. An image display as defined in claim 6, wherein the front sheet inward surface is microstructured.

8. An image display as defined in claim 6, wherein the front sheet inward surface is prismatically microstructured.

9. An image display as defined in claim 6, wherein the front sheet inward surface further comprises a plurality of approximately hemispherical transparent hemi-beads.

10. An image display as defined in claim 6, wherein the electrophoresis medium is a perfluorinated hydrocarbon liquid.

11. An image display as defined in claim 6, wherein the means for applying a voltage further comprises a transparent first electrode on the front sheet inward surface and a second electrode on an inward surface of the rear sheet.

12. An image display as defined in claim 11, the second electrode further comprising a plurality of electrode segments, wherein application of the voltage between the first electrode and a selected one of the electrode segments establishes an electric field distinct from any electric field established by application of the voltage between the first electrode and any of the electrode segments other than the selected segment.

13. An image display method, comprising:
   (a) positioning a transparent front sheet substantially parallel to and spaced from a rear sheet;
   (b) suspending non-light-scattering light absorptive particles in an electrophoresis medium to create an electrophoretic suspension in which the particles occupy a sufficiently large volume fraction of the suspension to form a thermodynamically stable agglomeration such that the particles do not move freely within the electrophoresis medium;
   (c) substantially filling the space between the sheets with the electrophoretic suspension; and,
   (d) applying a voltage across the suspension for controllably electrophoretically move the agglomeration as a substantially unitary whole toward an inward surface of the front sheet to frustrate total internal reflection at the inward surface of light rays passing through the front sheet.

14. An image display method as defined in claim 13, wherein the particles occupy more than about a 25% volume fraction of the suspension.

15. An image display method as defined in claim 13, wherein the particles occupy between about a 25% and a 75% volume fraction of the suspension.

16. An image display method as defined in claim 13, further comprising adding a dispersant to the suspension.

17. An image display method as defined in claim 16, wherein the dispersant is a fluorinated oil.

18. An image display method as defined in claim 16, wherein applying the voltage further comprises:
   (a) applying a first voltage to compress the agglomeration as a substantially unitary whole toward the front sheet; and,
   (b) applying a second voltage to compress the agglomeration as a substantially unitary whole toward the rear sheet.

19. An image display method as defined in claim 18, further comprising microstructuring the inward surface of the front sheet.

20. An image display method as defined in claim 18, further comprising prismatically microstructuring the inward surface of the front sheet.

21. An image display method as defined in claim 18, further comprising forming a plurality of approximately hemispherical transparent hemi-beads on the inward surface of the front sheet.

22. An image display method as defined in claim 18, wherein the electrophoresis medium is a perfluorinated hydrocarbon liquid.

23. An image display method as defined in claim 18, further comprising:
   (a) applying a transparent first electrode to the inward surface of the front sheet;
   (b) applying a second electrode to the inward surface of the rear sheet;
   wherein applying the voltage further comprises applying the voltage between the first and second electrodes.

24. An image display method as defined in claim 23, further comprising dividing the second electrode into a plurality of electrode segments, wherein applying the voltage further comprises applying the voltage between the first electrode and a selected one of the electrode segments to establish an electric field distinct from any electric field established by applying the voltage between the first electrode and any of the electrode segments other than the selected segment.

* * * * *